United States Patent Office 2,732,867
Patented Jan. 31, 1956

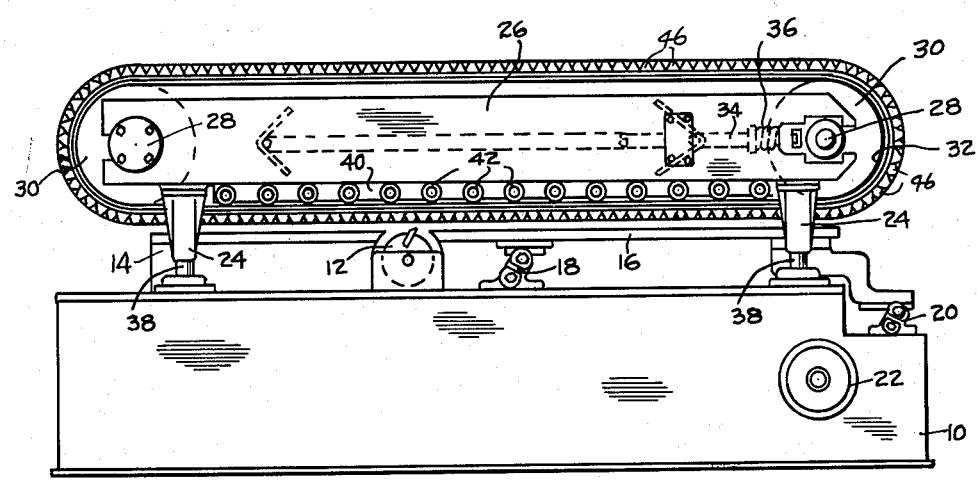

2,732,867
FACING MACHINE WITH RESILIENT FINGERS BELT FEED

Elliot D. May and Daniel L. Webster, Winchendon, Mass., assignors to Baxter D. Whitney & Son, Inc., Winchendon, Mass., a corporation of Massachusetts Application June 12, 1953, Serial No. 361,313

1 Claim. (Cl. 144—128)

This invention relates to a new and improved facing machine, such machines ordinarily being used for planing off a single face of a board so as to provide the board with one true plane surface, whereupon the faced board may then be sent to the planer for planing off to size. Most boards being worked initially, after having been sawed or re-sawed, are warped, and this prevents efficient planing because of the fact that the planer requires a flat guiding face or surface on at least one side of the board in order to avoid the necessity for planing several times, when by initially facing the board it may be processed at one pass through the planer.

In the present case, the invention resides specifically in the overhead conveyor belt, in combination with the cutter head which is in the bed of the machine and located on a horizontal axis. The conveyor belt is above the cutter and travels the board to and past the cutter to make the cut, and it is important that this conveyor shall grip and feed the board without bending it, since if a warped board is bent by having pressure applied to it, it will spring back to original position after the facing cut and the face side of the board will not be truly planar but will still be warped.

To this end, this invention provides a conveyor and feeding belt comprising a series of hollow rubber fingers which are relatively closely spaced and which will grip and feed the board past the cutter and themselves be deformed to the configuration of the warped board rather than exerting such pressure on a board as will bend the board out of its original natural warped shape, while at the same time providing sufficient grip to propel the board through the machine without defacing the board.

Other objects and advantages of the invention will appear hereinafter.

Reference is to be had to the accompanying drawings, in which:

Fig. 1 is a view in side elevation of a machine according to the present invention;

Fig. 2 is an end elevation, showing the in-feed side of the machine;

Fig. 3 is a plan view of a section of a conveyor belt;

Fig. 4 is a view in elevation thereof, part being in section;

Fig. 5 is an enlarged section on line 5—5 of Fig. 3;

Fig. 6 is a plan view of a modified section; and

Fig. 7 is a cross section through a modified form of feeding member.

As shown in the drawing, the reference numeral 10 indicates generally the base of the machine upon which is mounted a horizontal planer type of cutter head generally indicated at 12. This cutter head is provided with an out-feed or rear table 14 which may be fixed, as its supporting surface is of course aligned with the cutters of the rotary cutter head 12.

The in-feed or front table 16 is adjustable as by linkages 18, 20, which are controlled by a hand wheel 22 for raising and lowering the table 16 relative to the cutting line of the cutter 12 and the rear table 14 for determining the depth of cut.

Mounted upon standards 24 at the sides of the table, there is an elongated heavy support 26 which provides bearing supports at 28 for the pulleys or wheels 30 of a belt 32. These pulleys may be driven by any means desired such as by means of a belt or motor and one of the pulleys is adjustable by means for instance of a screw at 34 within the frame 26, and also there is provided a spring 36 for providing uniform tension on the belt 32. The standards 24 may be adjustable by means of screws 38 which may be controlled in any way desired according to the boards being processed.

At its lower side, the frame 26 is provided with a roller frame 40 accommodating a series of idle rolls 42 providing a backing for belt 32 at the points of engagement with boards being fed along tables 16 and 14 past the cutter.

Mounted upon the belt 32, there is a series of molded rubber sections generally indicated at 44. These sections are secured to the belt 32 in any way desired, but preferably they are cemented thereto. Each of these sections includes a plurality of fingers 46, which may be in the form of a truncated cone. These fingers are hollow as seen in Figs. 4 and 5 and may be provided at their smaller ends with depressions 48, or they may be flat fingers.

The smaller ends of the cups engage the warped boards being faced and due to their soft flexible rubbery consistency, they will press upon and grip and feed the boards in the manner desired, themselves being deformed to compensate for the irregularities in the warped boards but not exerting pressure enough to deform the boards. Therefore, when the boards are fed through the cutter head, they are faced off on a true plane, so that succeeding operations may be based upon a true planar face of the board, and it is emphasized that if the boards are pressed or deformed out of their warped condition, and then faced, they will spring back to their warped condition after the facing operation, so that the advantage of the facing operation will be largely lost.

The conical shape provided herein ensures that the smaller ends which initially contact and grip the boards are most easily deformed and yield to accommodate the board and the depressions 48 help to grip the boards without, however, exerting bending pressure thereon. Furthermore, the boards are not defaced in any way or marked and the large number of conical fingers described ensure that all parts of all boards will be firmly gripped and pass through the facing machine.

In Fig. 6 there is shown a section of molded rubber or like material indicated at 50 and this is provided with an indentation 52 and an extension 54 which inter-fit when the parts are applied to the belt 32.

This application for patent has disclosed the feeding fingers as being conical in shape but it is to be emphasized that many other shapes are also permitted and one of them which is of curved form is shown in Fig. 7 and indicated at 56. This curved section may be hemispherical or other shape and of course further shapes come within the purview of the present invention.

Having thus described our invention and the advantages thereof, we do not wish to be limited to the details herein disclosed, otherwise than as set forth in the claim, but what we claim is:

A facing machine comprising a base, a cutter head thereon, front and rear tables associated with said cutter head, an overhead frame, a conveyor thereon, means supporting said conveyor above the tables and cutter head, and a plurality of rows of elongated soft flexible fingers on said conveyor, said fingers extending across the conveyor, said fingers tapering down in a direction toward the tables and cutter head away from the conveyor, whereby a board being faced is engaged and fed by the smaller ends of the plurality of fingers, said fingers being truncated at said smaller ends and engaging the board at the truncated ends thereof.

References Cited in the file of this patent

UNITED STATES PATENTS

| | | |
|---|---|---|
| 803,972 | Bechman | Nov. 7, 1905 |
| 1,228,649 | Childs | June 5, 1917 |
| 1,422,398 | Wentz | July 11, 1922 |
| 1,957,621 | Styron | May 8, 1934 |
| 2,169,772 | Schweitzer | Aug. 15, 1939 |
| 2,407,098 | Raiche | Sept. 3, 1946 |
| 2,593,745 | Gillespie | Apr. 22, 1952 |
| 2,595,879 | Pasquier | May 6, 1952 |